United States Patent [19]

Akabayashi et al.

[11] 3,980,487
[45] Sept. 14, 1976

[54] ANTICORROSIVE GYPSUM COMPOSITION

[75] Inventors: Hiroshi Akabayashi, Hoya; Nobuo Akiyama, Yokosuka; Fumiyoshi Arima, Fuchu, all of Japan

[73] Assignee: Nissan Chemical Industries, Ltd., Tokyo, Japan

[22] Filed: June 27, 1975

[21] Appl. No.: 590,833

Related U.S. Application Data

[63] Continuation-in-part of Ser. No. 532,154, Dec. 12, 1974, abandoned.

[30] Foreign Application Priority Data

Dec. 12, 1973  Japan.............................. 48-139224

[52] U.S. Cl............................... 106/111; 106/109; 106/110; 252/389 R
[51] Int. Cl.²........................................ C04B 11/14
[58] Field of Search ........... 106/109, 110, 111, 115; 252/387, 389 R

[56] References Cited
UNITED STATES PATENTS

| | | | |
|---|---|---|---|
| 89,053 | 3/1869 | Lowrey............................. | 106/111 |
| 1,565,043 | 12/1925 | Avis.................................... | 252/387 |
| 1,591,397 | 7/1926 | Ness.................................... | 106/111 |
| 1,968,722 | 7/1934 | Stone................................. | 252/387 |
| 2,147,149 | 2/1939 | Clapsadle et al................... | 352/387 |
| 2,252,385 | 8/1941 | Orozco............................... | 252/387 |
| 2,264,389 | 12/1941 | Lamprey............................ | 252/387 |
| 2,352,201 | 6/1944 | Jacob.................................. | 106/111 |
| 3,219,467 | 11/1965 | Redican et al..................... | 106/90 |
| 3,227,651 | 1/1966 | Peterson............................ | 252/387 |
| 3,284,227 | 11/1966 | Gerton............................... | 106/111 |
| 3,316,901 | 5/1967 | Smith................................. | 106/115 |
| 3,409,080 | 11/1968 | Harrison............................ | 106/115 |
| 3,520,708 | 7/1970 | Chambers.......................... | 106/111 |
| 3,598,621 | 8/1971 | Ferrara.............................. | 106/111 |
| 3,872,204 | 3/1975 | Yano et al.......................... | 106/111 |

OTHER PUBLICATIONS

"Concrete Technology and Practice," W. H. Taylor, American Elsevier Publishing Co., New York, 1965 pp. 316-318.

*Primary Examiner*—Patrick P. Garvin
*Assistant Examiner*—John P. Sheehan
*Attorney, Agent, or Firm*—Oblon, Fisher, Spivak, McClelland & Maier

[57] ABSTRACT

An anticorrosive gypsum composition is formed from 0.1–10 wt% of a nitrite with gypsum.

The gypsum compositions formed from 100 wt. parts of gypsum, 0.1 – 10 wt. parts of a nitrite; 0.1 – 10 wt. parts of a water holding agent and 1 – 300 wt. parts of a filler; are useful for anticorrosive gypsum boards, anticorrosive gypsum plasters and the like.

4 Claims, No Drawings

ANTICORROSIVE GYPSUM COMPOSITION

CROSS-REFERENCE TO RELATED APPLICATIONS

This application is a continuation-in-part of U.S. application Ser. No. 532,154, filed Dec. 12, 1974 now abandoned.

BACKGROUND OF THE INVENTION

1. Field of the Invention

The present invention relates to an anticorrosive gypsum composition which is highly anticorrosive when in contact with metal. The invention can be applied to various gypsum products, especially to anticorrosive gypsum boards, anticorrosive gypsum plasters and the like.

2. Description of the Prior Art

Heretofore, in addition to being an important inorganic raw material, hardened gypsum has been used for gypsum board and gypsum plaster, etc. because of its high strength. However, it has been found that gypsum suffers from the disadvantage of being corrosive to metals such as mild steel when in contact with them. This is due to the acidic property of gypsum itself or to the small amount of residual phosphoric acid found in gypsum formed as a by-product in the preparation of phosphoric acid. In order to overcome this disadvantage in the past, anticorrosive processing of the metal surface or use of expensive noncorrosive metals have been employed. For example, iron nails cannot be used in conjunction with gypsum board for construction because of the corrosive action of the gypsum. Accordingly, it has been necessary to use zinc coated iron nails or stainless steel nails. Moreover, when gypsum plaster is used in making a wall surface, iron products hung on the wall, such as iron nails, when in contact with the gypsum plaster can be disadvantageously corroded. Once again, in order to overcome this disadvantage, noncorrosive metals have been obligatory. It would be most desirable to have a gypsum composition which is not corrosive to metals with which it is in contact.

SUMMARY OF THE INVENTION

Accordingly, one object of the present invention is to provide a non-corrosive gypsum composition which does not corrode metals such as mill steel and iron, etc.

It is another object of the present invention to provide a noncorrosive gypsum and a hardened gypsum product such as gypsum board and gypsum plaster with which mild steel, iron and other potentially corrodible metal products can be contacted.

These and other objects of this invention, as will hereinafter be made clear by the discussion below, have been attained by providing a gypsum composition consisting of 100 wt. parts of gypsum, 0.1 – 10 wt. parts of a nitrite, 0.1 – 10 wt. parts of a water holding agent and 1 – 300 wt. parts of a filler.

DETAILED DESCRIPTION OF THE PREFERRED EMBODIMENTS

Suitable raw materials used in the invention are natural gypsum, synthetic gypsum, gypsum produced in a preparation of phosphoric acid, etc.

It should be noted that gypsum has the following forms:

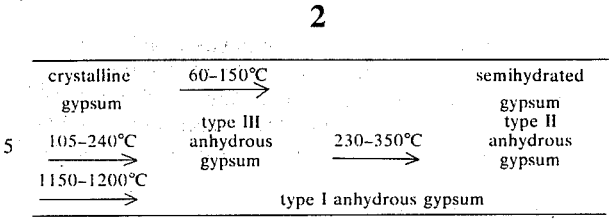

Suitable nitrites used in the invention are sodium nitrite, potassium nitrite, calcium nitrite, ammonium nitrite, etc. From the viewpoint of cost and industrial availability, it is preferable to use sodium nitrite and calcium nitrite. It is also possible to use a mixture of two or more nitrites.

Additionally, it is possible to include other compounds together with the nitrite and still produce an anticorrosive gypsum composition. For example, calcium nitrite can be prepared with high efficiency by oxidizing ammonia and absorbing the resulting oxide of nitrogen in a milk of lime. The resulting calcium nitrite usually contains 1 – 50 wt% of calcium nitrate. The mixture of calcium nitrite and 1 – 50 wt% of calcium nitrate can be used as the additive for the anticorrosive gypsum composition without separating calcium nitrate.

It is preferable to use a proportion of 0.1 – 10 wt% of nitrite of gypsum in order to prepare the anticorrosive gypsum composition. When the nitrite concentration is less than 0.1 wt%, the resulting gypsum composition has unsatisfactory anticorrosive properties. When the nitrite concentration is higher than 10 wt%, the resulting gypsum composition has sufficient anticorrosive properties, but other disadvantages arise, e.g., a hardened gypsum product has low strength. Accordingly, the anticorrosive gypsum composition of the invention is comprised of 0.1 – 10 wt% of the nitrite with the gypsum.

The hardening regulators include hardening accelerators such as ammonium sulfate, potassium sulfate; and hardening retardants such as glue hydrolysis product, defatted soybean hydrolysis product, zinc oxide, borax, sodium phosphate, sodium tripolyphosphate and the like. The hardening regulator is added at a ratio of 0.1 – 6 wt. parts of 100 wt. parts of gypsum.

The water holding agents include dextrin, methyl cellulose, polyvinyl acetate, polyvinyl alcohol and the like. The water holding agent is added at a ratio of 0.01 – 10 wt. parts of 100 wt. parts of gypsum. The water holding agent has effect as a binder.

The filler includes pulp, asbestos glass fiber, sand, palaite, bentonite, chamotte diatomaceous earth and the like. The filler is added at a ratio of 1 – 400 wt. parts to 100 wt. parts of gypsum.

The anticorrosive gypsum board is formed by 100 wt. parts of gypsum, 0.2 – 10 wt. parts of calcium nitrite or a mixture of calcium nitrite and calcium nitrate (2 – 100% to calcium nitrite), 0.2 – 10 wt. parts of dextrin, 0.2 – 6 wt. parts of ammonium sulfate or potassium sulfate (hardening accelerator) and 1 – 10 wt. parts of palaite of pulp.

The anticorrosive gypsum plaster is formed by 100 wt. parts of gypsum, 0.2 – 10 wt. parts of calcium nitrite or a mixture of calcium nitrate and calcium nitrate (2 - 100% to calcium nitrite), 0.1 – 0.5 wt. part of defatted soybeam hydrolysis product, (hardening retarder) 0.02 – 0.1 wt. part of methyl cellulose 10 – 30 wt. parts of palaite and 5 – 15 wt. parts of diatomaceous earth.

The anticorrosive gypsum composition of the invention can be easily prepared by adding 0.1 - 10 wt.% of a powder of the nitrite and other agents to a slurry of gypsum and water and stirring the mixture, or by adding an aqueous solution or suspension of the nitrite to gypsum and stirring the mixture.

It is also possible to prepare it by any other method mixing gypsum, the nitrite and suitable other additives with water. The amount of water should be chosen so as to form a slurry or paste suitable for the application or processing operation.

Having generally described the invention, a more complete understanding can be obtained by reference to certain specific examples, which are included for purposes of illustration only and are not intended to be limiting unless otherwise specified.

EXAMPLE 1

TABLE 1

| Component | Analysis of Gypsum | |
|---|---|---|
| | Raw Gypsum | Calcined Gypsum |
| CaO | 32.0 | 38.28 |
| $SO_3$ | 45.0 | 52.24 |
| F | 0.5 | 0.52 |
| $P_2O_5$ | 0.32 | 0.59 |
| $F_2O_3$ | — | 0.02 |
| $K_2O$ | — | 0.02 |
| $Na_2O$ | — | 0.06 |
| $Al_2O_3$ | — | 0.09 |
| $SiO_2$ | — | 0.94 |
| water(hydration) | — | 5.88 |
| water(addition) | — | 1.35 |

The raw gypsum having the components listed in the second column of Table 1 was calcined at 180°C for 2.5 hours in a kettle to give the calcined gypsum having the components listed in column 3 of Table 1.

The calcined gypsum, water and the nitrite were mixed to prepare the gypsum compositions (1) - (10) (Table 2) of the invention and the gypsum composition (A) of the reference pursuant to the gypsum test method (Japanese Industrial Standard R-9112).

The setting times (initiation; appearance; final) of the compositions and the tensile strength of the hardened products were measured. Iron nails made of mild steel and having a length of 10 cm were deoiled with acetone and placed into each of the unhardened products of the compositions (1) - (10) and (A). The composites were kept at room temperature and atmospheric pressure for 200 hours or 2000 hours. The hardened gypsum products were split at the point of contact with the nails and the surfaces of the nails were inspected for rust and corrosion. The test results are also shown in Table 2.

Table 2

| Composition | Test Results | | | | | | | | | | |
|---|---|---|---|---|---|---|---|---|---|---|---|
| | (A) | (1) | (2) | (3) | (4) | (5) | (6) | (7) | (8) | (9) | (10) |
| Additive type | none | $NaNO_2$ | $NaNO_2$ | $NaNO_2$ | $Ca(NO_2)_2$ | $Ca(NO_2)_2$ | *1 $Ca(NO_2)_2$ | *1 $Ca(NO_2)_2$ | *1 $Ca(NO_2)_2$ | *1 $Ca(NO_2)_2$ | $Ca(NO_2)_2$ |
| amount to gypsum (wt.%) | | 0.1 | 0.5 | 1.0 | 0.1 | 0.5 | 1.0 | 0.13 | 0.63 | 1.25 | 3.75 |
| Setting time(seconds) | | | | | | | | | | | |
| initiation | 337 | 341 | 358 | 362 | 342 | 348 | 363 | 342 | 353 | 363 | 391 |
| appearance | 490 | 521 | 536 | 556 | 504 | 481 | 588 | 513 | 509 | 572 | 586 |
| final | 1324 | 1522 | 1515 | 1475 | 1433 | 1508 | 1477 | 1478 | 1512 | 1461 | 1423 |
| Tensile strength (kg/cm²) | 13.2 | 12.3 | 12.5 | 12.0 | 12.5 | 12.4 | 13.0 | 12.4 | 12.3 | 12.3 | 10.6 |
| Condition of rust*2 | | | | | | | | | | | |
| after 200 hours | X | O | O | O | O | O | O | O | O | O | O |
| after 2000 hours | ⊙ | O | O | O | Δ | O | O | O | O | O | O |

(Note:) *1: mixture of $Ca(NO_2)_2$ and $Ca(NO_3)_2$, 80 : 20 by weight
*2: O no rust   Δ partially rusted
    X wholly rusted   ⊙ corroded The compositions containing $NaNO_2$, $Ca(NO_2)_2$ and the mixture of $Ca(NO_2)_2$ and $Ca(NO_3)_2$ present in a ratio of 80/20 by weight had excellent anticorrosive properties. This is very remarkable when compared with the results of the reference containing no nitrite. The tensile strength of the hardened products was also satisfactorily high. Although the hardening time was slightly prolonged by the addition of the nitrite, it can be shortened by the addition of an acidic salt such as ammonium sulfate. Accordingly, this is not a disadvantage.

Having now fully described the invention, it will be apparent to one of ordinary skill in the art that many changes and modifications can be made thereto without departing from the spirit or scope of the invention as set forth herein.

EXAMPLE 2

The compositions of a light weight plaster and a heavy weight plaster shown in Table 3 wer prepared by using the calcined gypsum of Example 1.

TABLE 3

| Composition | Light weight plaster (wt. part) | Heavy weight plaster (wt. part) |
|---|---|---|
| Calcined gypsum | 100 | 100 |
| Palaite | 20 | — |
| Diatomaceous earth | 10 | — |
| Methyl cellulose | 0.05 | 0.05 |
| Defatted soybean hydrolysis product | 0.3 | 0.3 |
| Nitrite | Table 4 | Table 4 |

The light weight plaster was prepared by mixing diatomaceous earth, methyl cellulose and the nitrite and then, admixing with calcined gypsum and palaite in V-shape mixer for 30 minutes.

The heavy weight plaster was prepared by mixing 5 wt. parts of calcined gypsum, methyl cellulose and the nitrite, and then admixing with the remaining calcined gypsum in V-shape mixer for 30 minutes.

The compositions of the plaster were considered to impart 2 - 4 hours of setting time (initiation) and good moldability according to preliminary tests. The characteristics of the gypsum plasters prepared from the compositions were tested by Japanese Industrial Standard A 6904. The condition of rust was observed by the test method of Example 1. The results are shown in Table 4.

TABLE 3

| Composition | Ref. | (11) | (12) | (13) | (14) | Ref. | (15) | (16) | (17) | (18) |
|---|---|---|---|---|---|---|---|---|---|---|
| | Light weight plaster | | | | | Heavy weight plaster | | | | |
| Nitrite type | none | $Ca(NO_2)_2$ | $Ca(NO_2)_2$ | $NaNO_2$ | $NaNO_2$ | none | $Ca(NO_2)_2$ | $Ca(NO_2)_2$ | $NaNO_2$ | $NaNO_2$ |
| amount of gypsum (wt.%) | 0 | 0.5 | 1.0 | 0.5 | 1.0 | 0 | 0.5 | 1.0 | 0.5 | 1.0 |
| Water (wt. part) | 85 | 84 | 83 | 85 | 84 | 72 | 75 | 70 | 70 | 72 |
| Bending strength ($kg/cm^2$) | 16.8 | 17.5 | 16.5 | 16.2 | 16.0 | 16.6 | 16.8 | 17.9 | 16.2 | 16.7 |
| Water holding rate (%) (10 min.) | 82 | 82 | 83 | 82 | 84 | 82 | 81 | 84 | 82 | 80 |
| Condition of rust | | | | | | | | | | |
| after 200 hours | X | O | O | O | O | X | O | O | O | O |
| after 2000 hours | X | O | O | O | O | X | O | O | O | O |

O no rust
X wholly rust
No cracking is formed in every cases.

EXAMPLE 3

The composition of a gypsum board shown in Table 5 was prepared by using the calcined gypsum of Example 1.

TABLE 5

| Composition | (wt. parts) |
|---|---|
| Calcined gypsum | 1000 |
| Pulp | 8 |
| Dextrin | 5 |
| Potassium sulfate | 4 |
| Nitrate | Table 6 |
| Water | 850 |

The gypsum board was prepared by preparing each of solutions of dextrin, potassium sulfate and nitrate in water and a suspension of pulp and mixing these solution and the suspension with calcined gypsum to form a slurry and molding the mixture on a board paper (300 g/m$^2$) to form the gypsum board having a thickness of 9 mm (area of 910 mm x 1820 mm). The gypsum board was cut and dried at 150 – 100°C for 90 minutes to prepare the sample.

The characteristics of the gypsum boards from the compositions were tested by Japanese Industrial Standard A 6901. The condition of rust was observed by the test method of Example 1.

The results are shown in Table 6.

TABLE 6

| Composition | Ref. | (19) | (20) | (21) | (22) |
|---|---|---|---|---|---|
| Nitrite | — | $Ca(NO_2)_2$ | $Ca(NO_2)_2$ | $Na_2NO_2$ | $Na_2NO_2$ |
| amount to gypsum (wt.%) | 0 | 0.5 | 1.0 | 0.5 | 1.0 |
| Thickness of board (mm) | 8.90 | 8.87 | 8.90 | 8.93 | 8.90 |
| Water content (%) | 1.1 | 1.2 | 1.2 | 1.1 | 1.2 |
| Bending strength ($kg/cm^2$) | | | | | |
| longitude | 54.3 | 54.5 | 54.1 | 54.7 | 54.4 |
| transverse | 20.1 | 20.3 | 19.9 | 19.8 | 20.0 |
| Paper peeling test | good | good | good | good | good |
| Condition of rust | | | | | |
| after 200 hours | X | O | O | O | O |
| after 2000 hours | X | O | O | O | O |

O no rust
X wholly rust

Excellent anticorrosive effect was found by the addition of the nitrite and the characteristic of the gypsum plaster and gypsum board were not deteriorated by the addition of the nitrite.

We claim:

1. A set plaster composition which consists essentially of 100 wt. parts of calcined gypsum, 0.1 – 10 wt. parts of calcium nitrite or a mixture of calcium nitrite and from 2 to 100% of calcium nitrate relative to the amount of calcium nitrite, 0.05 – 5 wt. parts of methyl cellulose, polyvinylalcohol, polyvinylacetate or a mixture thereof, 0.1 – 6 wt. parts of defatted soybean-hydrolysis product, zinc oxide, sodium phosphate or sodium tripolyphosphate, and 1 – 300 wt. parts of pulp, palaite, diatomaceous earth, bentonite or a mixture thereof.

2. A set light-weight plaster composition which consists essentially of 100 wt. parts of calcined gypsum, 0.1 – 10 wt. parts of calcium nitrite or a mixture of calcium nitrite and from 2 to 100% of calcium nitrate relative to the amount of calcium nitrite, 0.05 -5 wt. parts of methyl cellulose, polyvinyl alcohol, polyvinyl acetate or a mixture thereof and, 0.1 - 6 wt. parts of defatted soybean-hydrolysis product, zinc oxide, sodium phosphate or sodium tripolyphosphate.

3. A set gypsum board which consists essentially of 100 wt. parts of calcined gypsum, 0.1 – 10 wt. parts of calcium nitrite or a mixture of calcium nitrite and from 2 to 100% of calcium nitrate relative to the amount of calcium nitrite, 0.1 – 10 wt. parts of dextrin, polyvinyl alcohol, polyvinyl acetate, or a mixture thereof, 0.1 - 6 wt. parts of ammonium sulfate and, 2 – 300 wt. parts of pulp, sand, palaite, bentonite, diatomaceous earth or a mixture thereof.

4. The set plaster composition of claim 1 wherein 1 – 100 wt. parts of pulp palaite, diatomaceous earth, bentonite or a mixture thereof, is contained.

* * * * *